W. S. SAUNDERS.
TEMPERATURE INDICATING DEVICE FOR INTERNAL COMBUSTION ENGINES.
APPLICATION FILED AUG. 12, 1914.
1,213,273.
Patented Jan. 23, 1917.
2 SHEETS—SHEET 1.
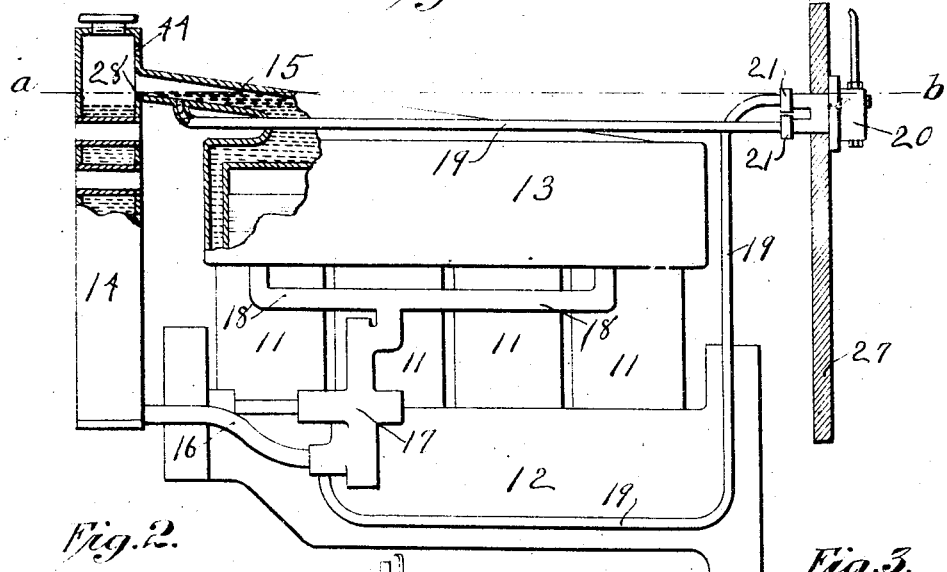
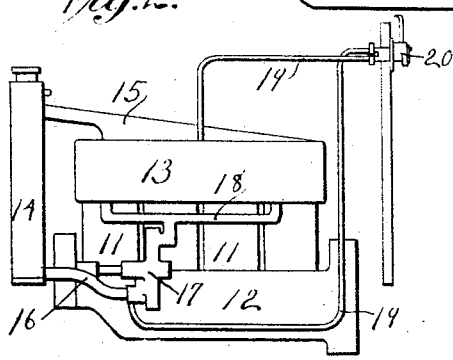
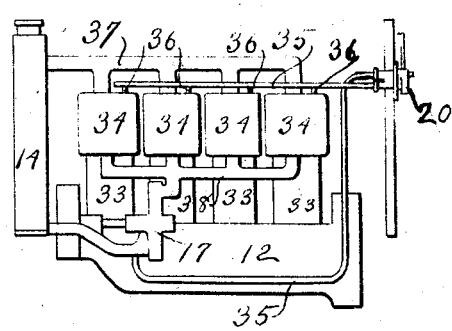
Inventor:
Walter S. Saunders
by Ralph N. Flint Atty.

W. S. SAUNDERS.
TEMPERATURE INDICATING DEVICE FOR INTERNAL COMBUSTION ENGINES.
APPLICATION FILED AUG. 12, 1914.
1,213,273.
Patented Jan. 23, 1917.
2 SHEETS—SHEET 2.
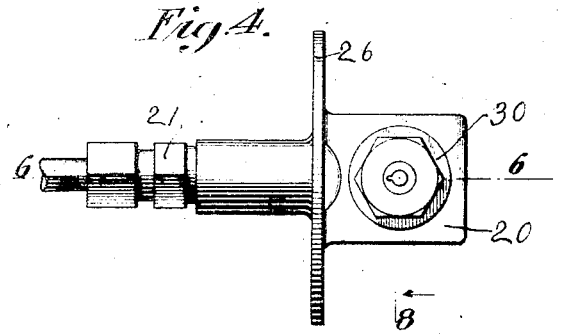
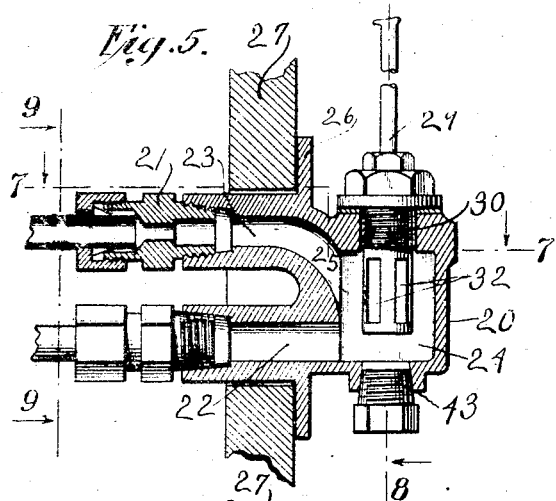
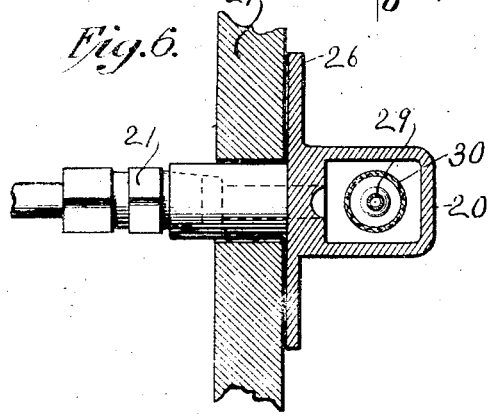
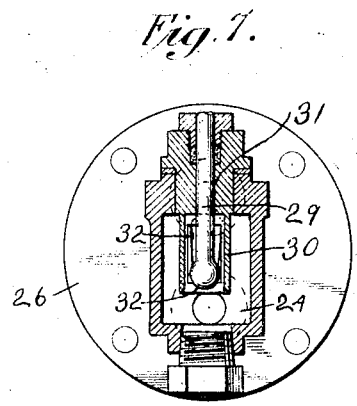
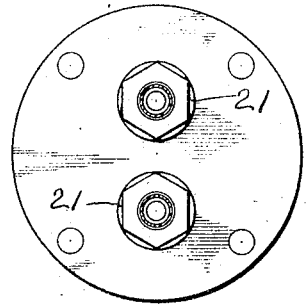
Attest:
Inventor:
Walter S. Saunders
by Ralph N. Flint Atty.

UNITED STATES PATENT OFFICE.

WALTER S. SAUNDERS, OF WESTFIELD, NEW JERSEY.

TEMPERATURE-INDICATING DEVICE FOR INTERNAL-COMBUSTION ENGINES.

1,213,273.  Specification of Letters Patent.  Patented Jan. 23, 1917.

Application filed August 12, 1914. Serial No. 856,339.

*To all whom it may concern:*

Be it known that I, WALTER S. SAUNDERS, a citizen of the United States, and a resident of Westfield, in the county of Union and State of New Jersey, have invented certain new and useful Improvements in Temperature-Indicating Devices for Internal-Combustion Engines, of which the following is a specification.

My invention relates to temperature indicating devices or means for indicating the temperature of the cooling liquid in liquid cooling systems of internal combustion engines; and particularly to temperature indicating devices used in connection with liquid cooling systems in which the engine is cooled by a liquid which flows through a jacket surrounding the working cylinder or cylinders, which liquid is then cooled as it flows through a radiator connected with the jacket by means of suitable conduits, and finally returns to the jacket, the cooling liquid being thus continuously circulated through the elements referred to and alternately heated and cooled.

The objects of my invention are to provide means for indicating the temperature of the cooling liquid at all times and irrespective of whether the temperature of said liquid is below or as high as its boiling point; to provide means for indicating the temperature of the cooling liquid characterized by the fact that a portion of the cooling liquid is made to flow past and to come into direct contact with the temperature indicating means; to provide means for indicating the temperature of the cooling liquid which means may be located at a distance from the cooling system and engine, and in a position such that it may at all times be readily seen by the operator of the engine; to provide means for indicating the temperature of the cooling liquid which will be simple in construction and effective for the purpose for which it is designed, and which may be easily and readily applied to existing types of cooling systems; and to provide such other improvements in and relating to temperature indicating means for liquid cooling systems of internal combustion engines as are more particularly and at length hereinafter referred to.

With the objects of invention above enumerated in view, my invention consists in the improved temperature indicating means for liquid cooling systems of internal combustion engines illustrated in the accompanying drawings, described in the following specification, and particularly claimed, and in such variations and modifications thereof as will be obvious to those skilled in the art to which my invention relates.

In the drawings accompanying and forming a part of this application and wherein the preferred embodiment of my invention is illustrated, and wherein the same reference numerals are employed to designate the same parts in the several views, Figure 1 is a view partly in side elevation and partly in section illustrating in a conventional manner a common type of liquid cooling system for internal combustion engines, with my improved temperature indicating device applied thereto; Figs. 2 and 3 are views in side elevation illustrating conventionally other types of liquid cooling systems, with my invention applied thereto in various ways; Fig. 4 is a plan view showing a thermometer casing forming a part of my improved temperature indicating device; Fig. 5 is a view showing a section of the same upon a central vertical plane indicated by the line 6, 6, Fig. 4. Fig. 6 is a view showing a section of the same upon horizontal planes indicated by the broken line 7, 7, Fig. 5. Fig. 7 is a view showing a section of the same upon a vertical transverse plane indicated by the line 8, 8, Fig. 5; and, Fig. 8 is a view showing a section upon a vertical transverse plane indicated by the line 9, 9, Fig. 5.

Referring to the drawings, and particularly to Fig. 1, the reference numeral 11 designates the working cylinders of a multiple cylinder internal combustion engine, 12 the base or crank case thereof, 13 a jacket common to all the cylinders and through which a cooling liquid is made to flow to cool the cylinders, 14 a radiator for cooling the cooling liquid, 15 a conduit connecting the jacket with the upper end of the radiator, and 16 a conduit leading from the lower end of the radiator to a circulating pump 17 which discharges the cooled cooling liquid through conduits 18 to the jacket; all these elements being parts of a common and well known form or type of circulating liquid cooling system for internal combustion engines and said elements being shown in a more or less conventional manner in the figure referred to.

The reference numeral 19 designates a conduit, which I refer to as a shunt conduit because of the fact that a part of the cooling liquid is diverted from the circulating system above traced and made to flow through it, the ends of which conduit communicate with the liquid cooling system at two points at which the temperature of the cooling liquid differ widely, the inlet end of said conduit being shown as connected with the conduit 15 at which the cooling liquid is at or near its highest temperature, while the discharge end of said conduit is shown as connected with the inlet side of the pump 17 at which the cooling liquid is at or near its lowest temperature. This pump is operated from the engine in any way and, when the system as a whole is in use, a part of the cooling water at or near its maximum temperature is withdrawn from the cooling system at the conduit 15 and flows downward through the shunt conduit 19 and is finally returned to the stream of cooling liquid as it enters the pump; this action being due in part to the action of the pump and in part to the tendency of the liquid in said shunt conduit to flow downward as it becomes cooler due to radiation and loss of heat through the wall of the conduit, which is commonly made from thin metal tubing and through which the heat is dissipated quite rapidly.

The reference numeral 20 designates a hollow casing provided with or carrying a temperature indicating instrument and which casing is included in the shunt conduit 19 and through which the liquid flowing in said conduit flows; said conduit being connected with the casing by any suitable connectors or unions shown at 21 and having inlet and outlet passages 22, 23 arranged alongside one another and which passages communicate with an internal chamber 24. The lowest portion of said outlet passage is at about the same level as the upper wall of said chamber, and said outlet passage is preferably inclined for a part of its length, as shown at 25, in order to secure a better circulation of the cooling liquid within the chamber; and in order to insure that the temperature indicating instrument shall be submerged at all times in the liquid in said chamber, and to avoid air pockets in said chamber. The casing 20 is provided with a flange 26 whereby it may be conveniently secured to the dash or instrument board 27 of an automobile, or to an equivalent support if the engine is used for a purpose other than to drive an automobile, the temperature indicating instrument carried by said casing being thus placed in such a position that it may be readily and at all times seen by the operator.

The arrangement of the inlet and outlet passages alongside one another permits the casing to be put in place by cutting a single hole in the dash or instrument board, as will be understood; from which it follows that my improved temperature indicating device may be installed at a minimum of trouble and expense, it being merely necessary to provide a single hole in the dash or instrument board, secure the casing in place, provide openings in the circulating system for receiving the ends of the shunt conduit, and to connect the sections of the shunt conduit with the circulating system and with the casing 20 as hereinbefore explained.

The water level in the conduit 15 stands at about the line $a, b$, Fig. 1, when the engine is in operation, while when the engine is at rest the level of the liquid is commonly lower and depends upon the amount of liquid in the system, which liquid then assumes a uniform level throughout the system, as in most cases no valves are employed in any part of the system as a whole. The upper end of the conduit 19 is connected with the conduit 15 at a point below the lower edge 28 of the discharge end of said conduit, which conduit overflows into the radiator and which lower edge obviously determines the water level in the conduit when the engine is in operation, it being understood that the level of the water in the type of radiator contemplated in Fig. 1 may fall below the level indicated by the line $a, b$, as the liquid evaporates, or is otherwise lost, as by leaking from the system. It therefore follows that the inlet end of the shunt conduit 19 will be always submerged when the engine is in operation, and that air can under no circumstances enter said conduit and interfere with the operation of the circulating pump 17; the pump being always primed so long as there is any cooling liquid flowing through the conduit 15.

The temperature of the liquid within the chamber 24 and, consequently, of the liquid flowing in the shunt conduit may be indicated by means of any suitable temperature indicating or measuring instrument such, for example, as a thermostat, thermometer, or equivalent device. I have, however, shown a thermometer 29 as employed for this purpose, the same extending into the chamber so that the liquid flowing through the shunt conduit flows past and comes into direct contact with the bulb thereof, the bulb being submerged in the liquid at all times during the operation of the engine as the shunt conduit is then always full. A removable cage 30 is preferably provided for supporting the thermometer which extends through an opening 31 provided therein, said cage having openings 32 at its lower end to permit the liquid to come into direct contact with the bulb of the thermometer. The casing 20 is shown as provided with a removable plug 45 which may be removed to drain the chamber 24, as will be understood; and the upper end of the radiator is in communication with the atmosphere through an opening shown at 44, so that the interior thereof will be at atmosphere pressure.

Fig. 2 of the drawings illustrates the same engine and cooling system illustrated in Fig. 1; but the casing 20 is shown as located at a higher level than in Fig. 1, which may sometimes be desirable, and the inlet end of the shunt conduit 19 is shown as communicating directly with the jacket of the engine, which is also a desirable expedient in some cases. The inlet end of the shunt conduit is submerged in the scheme illustrated in this figure the same as in the scheme shown in Fig. 1, and as should always be the case in order to prevent air from entering the shunt conduit when the temperature indicating device is in use.

In Fig. 3 I have shown my invention as used in connection with an engine the cylinders 33 of which are provided with separate jackets 34, and the shunt conduit 35 as having branches 36 leading into each jacket in order that liquid may flow from each jacket through the said conduit; the conduits 37, 38 connecting the jackets with the radiator having separate branches communicating with each separate jacket, as shown.

While I have illustrated my invention as applied to the cooling system of an engine assumed to be used to propel an automobile or like self-propelled vehicle, the same may obviously be used in connection with stationary, marine, or other engines, as my invention is capable of use with and as forming a part of the cooling system of all types and kinds of engines and similar devices in which a cooling liquid is employed to cool the working cylinder, irrespective of the use to which the engine is put.

It will be appreciated that the temperature of the liquid as it enters the shunt conduit 19 corresponds approximately with the maximum temperature of the cooling liquid, and that the temperature within the chamber 24 where the temperature of the liquid flowing through the shunt conduit is measured or indicated will be dependent upon and an indication of the maximum temperature of the cooling liquid; the temperature in the chamber being usually somewhat lower, although not much lower, than the temperature in the conduit 15 and at the inlet end of the shunt conduit because of slight losses of heat due to radiation through the wall of the conduit.

It therefore follows that should the working cylinder become overheated due to faulty or insufficient lubrication, or to an improper combustible mixture, or to an improper operation of the cooling system or some one or more of its component parts, or due to any cause whatever, such excessive heating will result in an immediate rise of temperature in the liquid flowing in the shunt conduit and will be at once indicated by the thermometer or other temperature indicating instrument employed, and the cause of such overheating may be ascertained and the difficulty remedied before the engine has become injured. Furthermore, the temperature of the liquid flowing in the shunt conduit is an indication of whether or not the engine is operating at or near its highest efficiency, and the temperature in the chamber 24, or the reading of the temperature indicating instrument employed, corresponding with the best and most efficient operation of the engine having been ascertained by experiment or from accessible data, the reading of the temperature indicating or measuring instrument will indicate whether or not the temperature is at or near that associated with maximum efficiency, and, if the engine is operating either too hot or too cold, steps may be taken to so adjust and regulate the engine, carbureter, cooling system, or other device concerned with the operation thereof as to cause the engine to operate at or near the temperature at which it operates with the greatest efficiency.

Having thus described and explained my invention, I claim and desire to secure by Letters Patent:

In combination with a liquid cooling system for internal combustion engines including a cooling jacket, a radiator, two conduits whereby said jacket and radiator are placed in communication with one another, and a pump associated with one of said conduits for causing the liquid in the system to circulate; a shunt conduit through which a part of the cooling liquid may flow, one end of said conduit being connected with the cooling system at the inlet side of the pump, and the other end of said shunt conduit being connected to the system adjacent to and below the level of the liquid in the system, and a temperature indicating device for indicating the temperature of the liquid in said shunt conduit through which the liquid is caused by said pump to circulate from a higher to a lower level of said system.

In testimony whereof I have signed my name to this specification in the presence of two subscribing witnesses.

WALTER S. SAUNDERS.

Witnesses:
R. N. FLINT,
H. L. CADMUS.